(12) United States Patent
Lee et al.

(10) Patent No.: US 10,820,092 B2
(45) Date of Patent: *Oct. 27, 2020

(54) AUDIO OUTPUT APPARATUS CAPABLE OF OUTPUTTING MULTI CHANNEL AUDIO AND DISPLAY APPARATUS APPLYING THE SAME

(71) Applicant: SAMSUNG ELECTRONICS CO., LTD., Suwon-si (KR)

(72) Inventors: Gyeong-tae Lee, Seoul (KR); Jong-bae Kim, Seoul (KR); Dong-kyu Park, Hwaseong-si (KR); Sung-ha Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/693,491

(22) Filed: Nov. 25, 2019

(65) Prior Publication Data
US 2020/0100020 A1   Mar. 26, 2020

Related U.S. Application Data

(63) Continuation of application No. 14/902,974, filed as application No. PCT/KR2014/006054 on Jul. 7, 2014, now Pat. No. 10,491,985.

(Continued)

(30) Foreign Application Priority Data

Jun. 9, 2014   (KR) ........................ 10-2014-0069427

(51) Int. Cl.
*H04R 5/02* (2006.01)
*H04R 1/26* (2006.01)
(Continued)

(52) U.S. Cl.
CPC ............... *H04R 1/26* (2013.01); *H04N 5/642* (2013.01); *H04N 21/8106* (2013.01);
(Continued)

(58) Field of Classification Search
CPC .. H04R 1/2834; H04R 1/2826; H04R 1/2811; H04R 1/288
(Continued)

(56) References Cited

U.S. PATENT DOCUMENTS 5,852,545 A   12/1998   Pan-Ratzlaff
7,825,986 B2  11/2010   Chung
(Continued)

FOREIGN PATENT DOCUMENTS

CN    1822710 A      8/2006
EP    1 039 748 A2   9/2009
(Continued)

OTHER PUBLICATIONS

Communication dated Mar. 2, 2018, issued by the Chinese Patent Office in counterpart Chinese application No. 201480048652.0.
(Continued)

*Primary Examiner* — George C Monikang
(74) *Attorney, Agent, or Firm* — Sughrue Mion, PLLC

(57) ABSTRACT

According to an exemplary embodiment, a display apparatus includes: a display device configured to display a video data; and a plurality of integrated speakers configured to output a plurality of audio signals in a low-pitched tone band and a middle and high-pitched tone band. The plurality of integrated speakers may each include: a woofer speaker configured to output a first audio signal of the audio signals in the low-pitched tone band; and at least one front speaker which is adjacent to the woofer speaker and configured to output a second audio signal of the audio signals in the middle and high-pitched tone band.

7 Claims, 19 Drawing Sheets

Related U.S. Application Data

(60) Provisional application No. 61/843,118, filed on Jul. 5, 2013.

(51) Int. Cl.
*H04N 5/64* (2006.01)
*H04N 21/81* (2011.01)
*H04R 1/02* (2006.01)
*H04R 1/28* (2006.01)

(52) U.S. Cl.
CPC ............... *H04R 1/028* (2013.01); *H04R 5/02* (2013.01); *H04R 1/2826* (2013.01); *H04R 1/2834* (2013.01); *H04R 1/2849* (2013.01); *H04R 2499/15* (2013.01)

(58) Field of Classification Search
USPC ............... 381/300, 306, 307, 333, 335, 336
See application file for complete search history.

(56) References Cited

U.S. PATENT DOCUMENTS

| | | |
|---|---|---|
| 8,270,659 B2 | 9/2012 | Koizumi et al. |
| 8,447,052 B2 | 5/2013 | Lee et al. |
| 2001/0031061 A1 | 10/2001 | Coombs et al. |
| 2006/0078144 A1 | 4/2006 | Stiles et al. |
| 2006/0161964 A1 | 7/2006 | Chung |
| 2007/0003076 A1 | 1/2007 | Croft, III |
| 2007/0147648 A1 | 6/2007 | Koizumi et al. |
| 2010/0111343 A1 | 5/2010 | Hsu |
| 2011/0019855 A1 | 1/2011 | Lee et al. |
| 2011/0037906 A1 | 2/2011 | Gawronski et al. |
| 2011/0051971 A1 | 3/2011 | Nedelcu |
| 2011/0188679 A1 | 8/2011 | Lee et al. |
| 2012/0206651 A1 | 8/2012 | Minoda |
| 2013/0177185 A1 | 7/2013 | Takahashi et al. |

FOREIGN PATENT DOCUMENTS

| | | |
|---|---|---|
| JP | 4-192795 A | 7/1992 |
| JP | 2000-278630 A | 10/2000 |
| JP | 2002-27582 A | 1/2002 |
| JP | 2007-104112 A | 4/2007 |
| JP | 2007-181082 A | 7/2007 |
| JP | 2008153716 A | 7/2008 |
| JP | 2009-55450 A | 3/2009 |
| JP | 2010-226648 A | 10/2010 |
| JP | 2010-258942 A | 11/2010 |
| JP | 2011-114589 A | 6/2011 |
| JP | 2013-141119 A | 7/2013 |
| KR | 10-1996-0040076 A | 11/1996 |
| KR | 10-2005-0019356 A | 3/2005 |
| KR | 10-2006-0023229 A | 3/2006 |
| KR | 10-2007-0069265 A | 7/2007 |
| KR | 10-1631275 B1 | 6/2016 |
| WO | 2006/104101 A1 | 10/2006 |
| WO | 2011/052543 A1 | 5/2011 |

OTHER PUBLICATIONS

Communication dated Mar. 2, 2017 issued by European Patent Office in counterpart European Application No. 14819325.3.
Communication dated Jul. 30, 2019 by the Japanese Patent Office in counterpart Japanese Patent Application No. 2018-128585.
Communication dated Oct. 12, 2017, issued by the European Patent Office in counterpart European Application No. 14819325.3.
Communication dated Mar. 19, 2019, issued by the Indian Patent Office in counterpart Indian Application No. 201627001574.
Communication dated Feb. 28, 2017 issued by Japanese Intellectual Property Office in counterpart Japanese Application No. 2016-523672.
Communication dated Oct. 17, 2017, issued by the Japanese Patent Office in counterpart Japanese Application No. 2016-523672.
International Search Report dated Nov. 3, 2014 issued by the International Searching Authority in International Application No. PCT/KR2014/006054 [PCT/ISA/210].
Written Opinion dated Nov. 3, 2014 issued by the International Searching Authority in International Application No. PCT/KR2014/006054 [PCT/ISA/237].
Communication dated Apr. 28, 2020, issued by the Korean Intellectual Property Office in Korean Application No. 10-2014-0069427.

000# AUDIO OUTPUT APPARATUS CAPABLE OF OUTPUTTING MULTI CHANNEL AUDIO AND DISPLAY APPARATUS APPLYING THE SAME

CROSS-REFERENCE TO RELATED APPLICATIONS

This application is a Continuation Application of U.S. application Ser. No. 14/902,974, filed Jan. 5, 2016, which is a National Stage Entry of International Application No. PCT/KR2014/006054, filed on Jul. 7, 2014, in the Korean Intellectual Property Office, which claims priority from U.S. Provisional Application No. 61/843,118, filed on Jul. 5, 2013, in the U.S. Patent and Trademark Office, and Korean Patent Application No. 10-2014-0069427, filed on Jun. 9, 2014, in the Korean Intellectual Property Office, the disclosures of which are incorporated herein by reference in their entireties.

BACKGROUND

1. Field

Apparatuses and methods consistent with exemplary embodiments relate to an audio output apparatus and a display apparatus applying the audio output apparatus, and more particularly, to an audio output apparatus capable of outputting multi-channel audio and a display apparatus applying the same.

2. Description of the Related Art

Due to advancements in flat display panel technology, housing for display apparatuses, such as digital televisions (TVs), is getting slimmer. As display apparatuses become slimmer, various components configuring display apparatuses have been developed for the slimmed display apparatus. When display apparatuses become slimmer, an internal space of the speaker for outputting audio to a front surface of the display apparatus narrows. According to a related art display apparatus, audio is output through a speaker mounted in the display apparatus using a down-firing scheme and a back-firing scheme. A woofer speaker outputting audio in a low-pitched tone band is formed on a back surface of the display apparatus and each of the front speakers outputting audio in a middle-pitched and high-pitched tone band corresponding to a left channel and a right channel is formed at the left and right of a lower area of the display apparatus, respectively. Accordingly, the audio signal output through the woofer speaker is fired through the back surface of the display apparatus and the fired audio signal is diffracted by a back wall and a side wall adjacent to the display apparatus and transferred to the front surface of the display apparatus. Further, the audio signals output through each of the front speakers are fired through a lower surface of the display apparatus and the fired audio signals are diffracted and reflected by the lower surface adjacent to the display apparatus and transferred to the front surface of the display apparatus.

Therefore, a user in front of the display apparatus may listen to the audio output through the woofer speaker and the front speaker.

However, the related art method for outputting audio has disadvantages.

Because the woofer speaker and the front speaker output audio signals in different directions, a difference between a transfer distance of the audio signal output from the woofer speaker to the front surface of the display apparatus and a transfer distance of the audio signal output from the front speaker to the front surface of the display apparatus may occur. Therefore, a phase change in a crossover band in which the audio signals are commonly output in the low-pitched tone band and the middle and high-pitched tone band occurs in an area out of a position which is set in consideration of the distance difference. Therefore, when the user is positioned in the area in which the phase change in the crossover band occurs, the user may experience decreased sound quality when listening to low-quality audio in a section corresponding to the crossover band.

A phase difference between direct sound fired through the woofer speaker and sound reflected from the back wall may occur according to a distance degree between the display apparatus and the back wall. As described above, when the phase difference between the direct sound and the reflected sound occurs, a section in which a specific band needs to be offset and reinforced is changed. Thus, the audio signal in the desired low-pitched tone band may not be generated.

The related art woofer speaker may use a bass reflex enclosure or vented enclosure, to which a Helmholtz resonance scheme is applied, to be able to output the audio signal in which the low-pitched tone band is more reinforced than the related art woofer speaker. That is, the related art woofer speaker synthesizes front sound generated from a woofer unit and back sound reproduced in back of the woofer unit with duct sound amplified by the Helmholtz resonance to be able to output the audio signal in which the low-pitched tone band is reinforced. However, unlike the front sound fired by the back-firing scheme, the duct sound is attenuated by an internal structure configuring the display apparatus and emitted from a clearance of the housing, such that the duct sound is partially lost while being synthesized with the front sound. Therefore, the synthesized sound of the duct sound with the front sound may have a low band loss or noise.

FIG. 1 is a diagram of an operation of outputting an audio signal through a speaker mounted in a related art display apparatus.

As illustrated in FIG. 1, a display apparatus 10 includes a woofer speaker 20 and front speakers 30a and 30b. The woofer speaker 20 is a speaker which is mounted on one side of a back surface of the display apparatus 10 to output an audio signal in a low-pitched tone band applied from the outside. The woofer speaker 20 may include a woofer device 21 which generates acoustic oscillation in connection with the audio signal in the low-pitched tone band which is applied from the outside. Therefore, the woofer speaker 20 fires front sound for the acoustic oscillation generated by the woofer device 21 by a back-firing scheme to output the audio signal in the low-pitched tone band which is applied from the outside. Therefore, the audio signal in the low-pitched tone band output through the woofer speaker 20 is diffracted by a back wall surface adjacent to the display apparatus 10 or the back wall surface and a side wall surface and transferred to a front surface of the display apparatus 10.

Further, the front speakers 30a and 30b are speakers which are each mounted on both sides of a lower surface of the display apparatus 10 to output an audio signal in a middle and high-pitched tone band which is applied from the outside. The front speaker (hereinafter, referred to as a first front speaker) 30a is mounted in a left area of the lower surface of the display apparatus 10 to output a left audio signal in a middle and high-pitched tone band. The other front speaker (hereinafter, referred to as a second front speaker) 30b is mounted in a right area of the lower surface of the display apparatus 10 to output a right audio signal in a middle and high-pitched tone band. As such, the first and second front speakers 30*a* and 30*b*, which are mounted at the left and right of the lower surface of the display apparatus 10, output the left and right audio signals in the middle and high-pitched tone band by a down-firing scheme. Therefore, the left and right audio signals in the middle and high-pitched tone band output through the first and second front speakers 30*a* and 30*b* are each diffracted by the lower surface adjacent to the display apparatus 10 and transferred to the front surface of the display apparatus 10.

As such, the display apparatus 10 outputs the audio signals in the low-pitched tone band and the middle and high-pitched tone band through the woofer speaker 20 and the first and second front speakers 30*a* and 30*b*. Therefore, a user may enjoy high-quality audio sound. However, the audio signals in the low-pitched tone band and the middle and high-pitched tone band output through the woofer speaker 20 and the first and second front speakers 30*a* and 30*b* in the display apparatus 10 have a phase difference in a specific band according to a listening position of the user. Thus, a sound quality of audio in the specific band may deteriorate.

As described above, the woofer speaker 20 is mounted on one side of the back surface of the display apparatus 10 to output the audio signal by the back-firing scheme and the first and second front speakers 30*a* and 30*b* are each mounted in the left and right areas of the lower surface of the display apparatus 10 to output the audio signal by the down-firing scheme. Therefore, a distance difference may occur between a transfer distance of the audio signal output from the woofer speaker 20 to the front surface of the display apparatus 10 and a transfer distance of the audio signals output from the first and second front speakers 30*a* and 30*b* to the front surface of the display apparatus 10. A frequency response in the specific band may be changed according to the listening position of the user due to the distance difference. Here, the specific band is a section in which the audio signals are commonly output in the low-pitched tone band and the middle and high-pitched tone band. The specific band in which the audio signals are commonly output in the low-pitched tone band and the middle and high-pitched tone band is referred to as a crossover (X-over) band. For example, when a phase difference of both ends of the X-band is set to be 0 degrees, the corresponding band is filled due to constructive interference. Further, when the phase difference of both ends of the X-band is set to be 180 degrees, the corresponding band has a deep dip due to destructive interference. The related display apparatus 10 is subjected to parametric equalizer (PEQ) tuning so that the phase difference of the section in which the X-band in a band between the woofer speaker 20 and the first and second front speakers 30*a* and 30*b* based on a center of a screen is set to be 0 degrees. However, in the case of tuning the display apparatus 10 by the related art scheme, when the listening position of the user is at the left or right of the display apparatus 10, a phase change of the X-band occurs. Thus, the user at the left or right of the display apparatus 10 has decreased sound quality when listening to low-quality audio in the section corresponding to the X-band.

Further, the audio signal in the low-pitched tone band output through the woofer speaker 20 in the display apparatus 10 is transferred to the front surface of the display apparatus 10, while being diffracted by synthesis of direct sound fired through the woofer speaker 20 with sound reflected by a back wall. In this case, a phase difference between the direct sound fired through the woofer speaker 20 and the sound reflected from the back wall may occur according to a distance degree between the display apparatus 10 and the back wall. When the phase difference between the direct sound and the reflected sound occurs, the section in which the specific band needs to be offset and reinforced is changed. Thus, the desired audio signal in the low-pitched tone band may not be generated.

FIG. 2 is another diagram of the operation of outputting the audio signal through the speaker mounted in a related art display apparatus.

As illustrated in FIG. 2, the display apparatus 10 includes the woofer speaker 20 and the first and second front speakers 30*a* and 30*b*. As described above, the front speaker 30*a* is mounted in the left area of the lower surface of the display apparatus 10 to output the left audio signal in the middle and high-pitched tone band and the second front speaker 30*b* is mounted in the right area of the lower surface of the display apparatus 10 to output the right audio signal in the middle and high-pitched tone band. As such, the first and second front speakers 30*a* and 30*b*, which are mounted at the left and right of the lower surface of the display apparatus 10, output the left and right audio signals in the middle and high-pitched tone band by the down-firing scheme. Therefore, the left and right audio signals in the middle and high-pitched tone band output through the first and second front speakers 30*a* and 30*b* are each diffracted by the lower surface adjacent to the display apparatus 10 and transferred to the front surface of the display apparatus 10.

Further, the woofer speaker 20 is a speaker which is mounted on one side of the back surface of the display apparatus 10 to output the audio signal in the low-pitched tone band applied from the outside. In this case, the woofer speaker 20 may output the audio signal in which the low-pitched tone band is more reinforced than the woofer speaker 20 described with reference to FIG. 1 using the Helmholtz resonance scheme. To this end, the woofer speaker 20 may include the woofer device 21 and a duct 23. The woofer device 21 generates the acoustic oscillation in connection with the audio signal in the low-pitched tone band which is applied from the outside. Further, the duct 23 again inverts back sound having an antiphase reproduced in back of the woofer device 21 as much as 180 degrees in a band which is equal to or more than a resonance frequency to fire duct sound in which the low-pitched tone band is reinforced.

Therefore, the woofer speaker 20 fires the synthesized sound of the front sound for the acoustic oscillation generated from the woofer device 21 with duct sound fired from the duct 23 by the back-firing scheme to be able to output the audio signal in which the low-pitched tone band is reinforced.

The duct sound synthesized with the front sound for the acoustic oscillation generated from the woofer device 21 is not synthesized with the front sound through a separate path but is emitted between a clearance of the housing configuring the display apparatus 10 and synthesized with the front sound. Therefore, the duct sound is partially lost while being synthesized with the front sound. Thus, a low band loss and noise of the audio signal output through the woofer speaker 20 may be generated.

SUMMARY

Exemplary embodiments may overcome the above disadvantages and other disadvantages not described above. Also, the exemplary embodiments are not required to overcome the disadvantages described above, and an exemplary embodiment may not overcome any of the problems described above.

Further, one or more exemplary embodiments may output multi-channel audio through a single speaker applied to a display apparatus.

According to an aspect of an exemplary embodiment, a display apparatus includes: a display device configured to display video data; and a plurality of integrated speakers configured to output at least one audio signal in a low-pitched tone band and at least one audio signal in a middle and high-pitched tone band, in which each integrated speaker among the plurality of integrated speakers may include: a woofer speaker configured to output a first audio signal among the at least one audio signal in the low-pitched tone band; and at least one front speaker that is adjacent to the woofer speaker and is configured to output a second audio signal among the at least one audio signal in the middle and high-pitched tone band.

The plurality of integrated speakers may be disposed in an end area of the display apparatus and the first audio signal and the second audio signal may be directed downward.

A first front speaker included in a first integrated speaker among the plurality of integrated speakers may be configured to output a left audio signal of a left channel as the second audio signal, and a second front speaker included in a second integrated speaker among the plurality of integrated speakers may be configured to output a right audio signal of a right channel as the second audio signal.

The woofer speaker may include a first woofer speaker and a second woofer speaker and each of the first woofer speaker and the second woofer speaker may be configured to output a same audio signal as the first audio signal in the low-pitched tone band.

The first woofer speaker and the second woofer speaker may each include: a woofer device configured to output woofer sound for the same audio signal in the low-pitched tone band; and a duct configured to resonate an acoustic of the woofer sound output from the woofer device to amplify the low-pitched tone band of the same audio signal, and the woofer device and the duct may each be disposed in a band pass enclosure or a vented enclosure.

The first and second woofer speakers may each include: a woofer device configured to output woofer sound for the same audio signal in the low-pitched tone band; and a diaphragm configured to resonate a vibration of the woofer sound output from the woofer device to amplify the low-pitched tone band of the same audio signal, and the woofer device and the diaphragm may each be disposed in a passive radiator enclosure of a band pass type or a passive radiator enclosure of a vented type.

The first front speaker and the second front speaker may be disposed in separately sealed enclosures.

The first front speaker and the second front speaker may each be disposed in a vented enclosure that resonates an acoustic of the second output audio signal in the middle and high-pitched tone band to amplify the low-pitched tone band of the first audio signal.

Each of the first front speaker and the second front speaker may be disposed in a passive radiator enclosure that resonates a vibration of the second output audio signal in the middle and high-pitched tone band to amplify the low-pitched tone band of the first audio signal.

The first integrated speaker and the second integrated speaker may each further include at least one tweeter that is adjacent to the first front speaker and the second front speaker to output the second audio signal in the middle and high-pitched tone band in a same output direction as an output direction of the left audio signal and the right audio signal.

According to an aspect of another exemplary embodiment, a display apparatus includes: a display device configured to display a video data; and an integrated speaker configured to output at least one audio signal in a low-pitched tone band and at least one audio signal in a middle and high-pitched tone band, in which the integrated speaker may include: a woofer speaker configured to output a first audio signal among the at least one audio signal in the low-pitched tone band; and at least one front speaker that is adjacent to the woofer speaker and configured to output a second audio signal among the at least one audio signal in the middle and high-pitched tone band.

The integrated speaker may be disposed in an end area of the display apparatus, and the first audio signal and the second audio signal, which may be respectively output from the woofer speaker and the at least one front speaker, may be directed downward.

The integrated speaker may include: a first front speaker among the at least one front speaker configured to output a left audio signal of a left channel as the second audio signal; and a second front speaker among the at least one front speaker configured to output a right audio signal of a right channel as the second audio signal, and the woofer speaker may be disposed between the first front speaker and the second front speaker.

The woofer speaker may include: a woofer device configured to output woofer sound for a same audio signal as the first audio signal in the low-pitched tone band; and a duct configured to resonate an acoustic of the woofer sound output from the woofer device to amplify the low-pitched tone band of the same audio signal, and the woofer device and the duct may each be disposed in a band pass enclosure or a vented enclosure.

The woofer speaker may include: a woofer device configured to output woofer sound for a same audio signal in the low-pitched tone band; and a diaphragm configured to resonate a vibration of the woofer sound output from the woofer device to amplify the low-pitched tone band of the same audio signal, and the woofer device and the diaphragm may each be disposed in a passive radiator enclosure of a band pass type or a passive radiator enclosure of a vented type.

Additional and/or other aspects of exemplary embodiments will be set forth in part in the description which follows and, in part, will be apparent from the description, or may be learned by practice of the exemplary embodiments.

BRIEF DESCRIPTION OF THE DRAWINGS

The above and/or other aspects will be more apparent by describing exemplary embodiments with reference to the accompanying drawings, in which.

DETAILED DESCRIPTION OF EXEMPLARY EMBODIMENTS

Below, exemplary embodiments will be described in detail with reference to the accompanying drawings.

A display apparatus 100 including an audio output apparatus which outputs audio in a low-pitched tone band and a middle and high-pitched tone band according to an exemplary embodiment will be described below.

Figure 1:
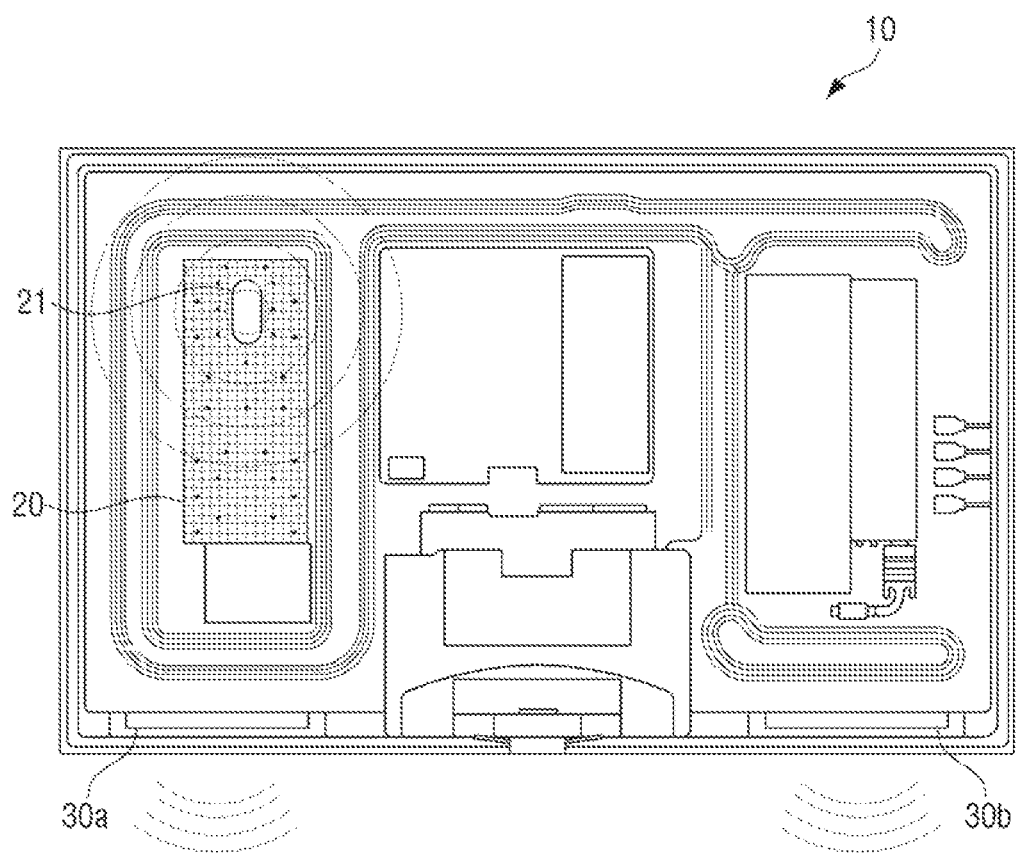
FIG. 1 is a diagram of an operation of outputting an audio signal through a speaker mounted in a related art display apparatus.
Figure 2:
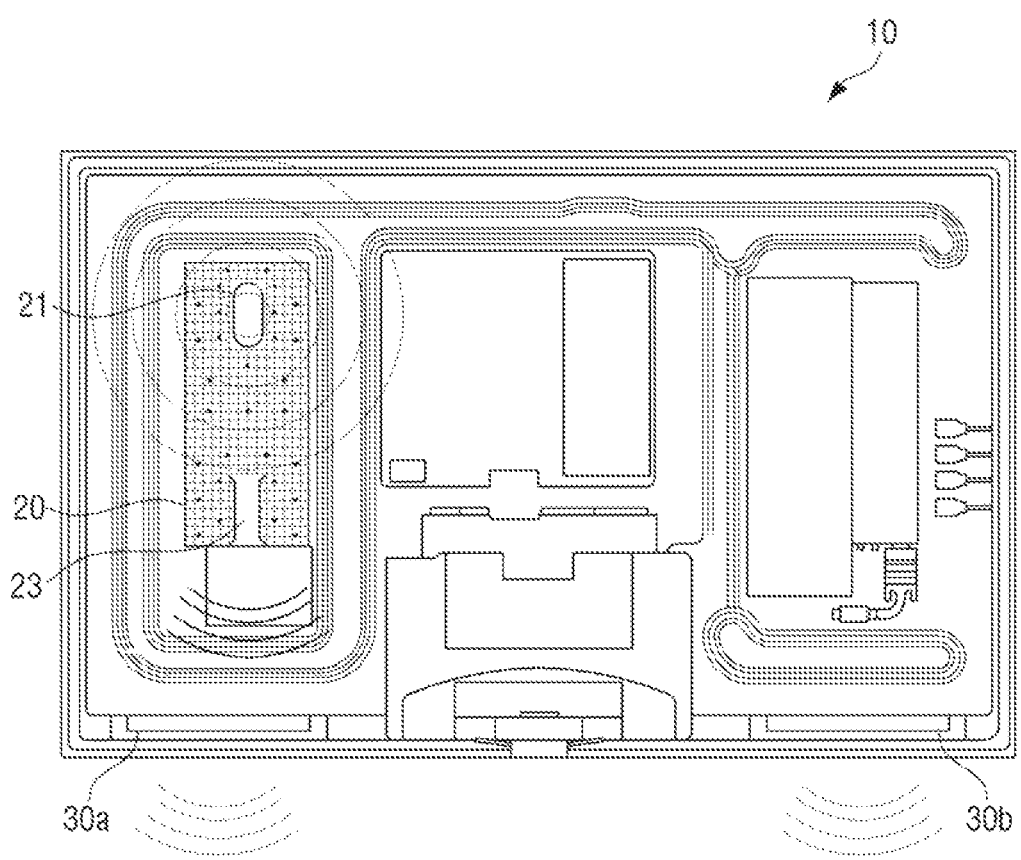
FIG. 2 is a diagram of the operation of outputting the audio signal through the speaker mounted in a related art display apparatus.
Figure 3:
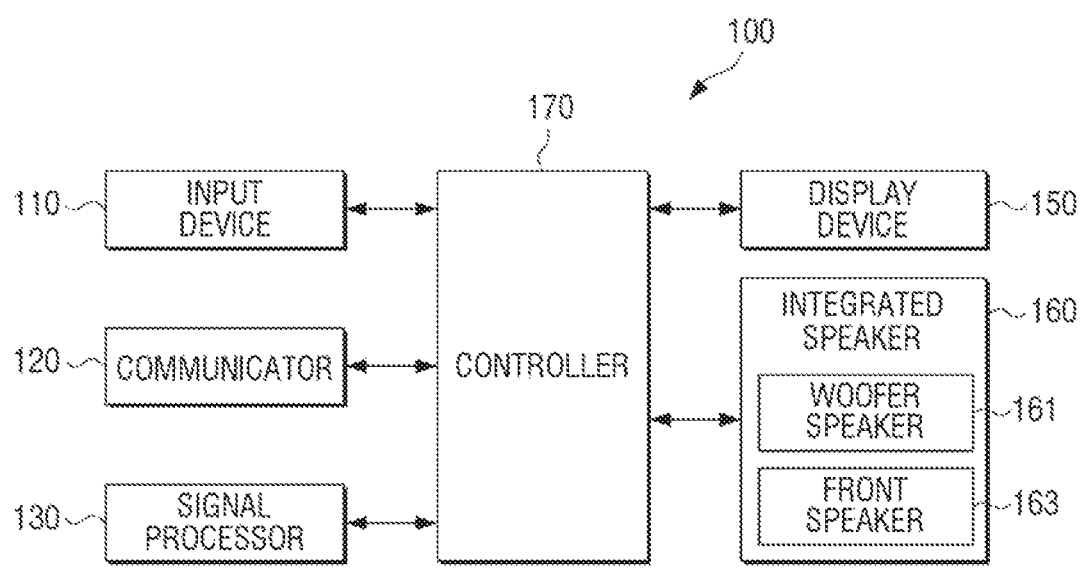
FIG. 3 is a block diagram of a display apparatus according to an exemplary embodiment.

FIG. 3 is a block diagram of the display apparatus according to an exemplary embodiment.

As illustrated in FIG. 3, the display apparatus 100 may be a reproducing apparatus capable of outputting video and audio such as a smart TV, a digital TV, and a smart phone. The display apparatus 100 includes an input device 110, a communicator 120, a signal processor 130, a display device 150, an integrated speaker 160, and a controller 170. At least one of the input device 110, the communicator 120, the signal processor 130, the display device 150, the integrated speaker 160, and the controller 170 may include a processor, hardware module, or a circuit for performing their respective functions.

The input device 110 receives a user command input from an input device such as a control panel or a touch panel which is included in the display apparatus 100, and transfers the received user command to the controller 170.

The communicator 120 may communicate with a contents server providing contents including video data and audio data to receive contents requested by a user or may communicate with a remote control device controlling the operation of the display apparatus 100 to receive the user command.

The communicator 120 may include various communication modules such as a local wireless communication module and a wireless communication module, and the like. Here, the local wireless communication module may be a module performing wireless communication with external devices located in a short distance according to a local wireless communication type such as Bluetooth and ZigBee. Further, the wireless communication module may be a module which is connected to an external network according to a wireless communication protocol such as WI-FI, IEEE, and the like, to perform communications. In addition, the wireless communication module may further include a mobile communication module which may be connected to a mobile communication network according to various mobile communication standards such as 3rd generation (3G), 3rd generation partnership project (3GPP), long term evolution (LTE), and the like to perform communications.

According to an exemplary embodiment, the communicator 120 communicates with the external devices by the wireless communication scheme. However, this is only an example, and the communicator 120 may communicate with the external devices by a wired communication scheme, etc.

The signal processor 130 processes a signal in a form in which the audio and video data of the contents received through the communicator 130 from the outside may be output through the display device 150 and the integrated speaker 160. When the signal processing is performed on the audio data included in the contents, the signal processor 130 may perform the signal processing on the corresponding audio data to correspond to the type of the integrated speaker 160. For example, when the integrated speaker 160 outputs multi-channel audio which outputs audio of the low-pitched tone band, the middle and high-pitched tone band, and the high pass band, the signal processor 130 may filter the corresponding audio data with the audio signals corresponding to each channel and output the filtered audio data through the integrated speaker 160.

The display device 150 displays the video data subjected to the signal processing by the signal processor 130 among the video and audio data included in the contents and various types of user interface (UI) menus which perform a control operation on the screen. The display device 150 may be implemented as a liquid crystal display (LCD), an organic light emitting display (OLED), a plasma display panel (PDP), and the like. The display device 150 may be implemented with a touch pad which receives a touch command of the user and may be implemented in a touch screen which forms a mutual layer structure along with the input device 110. The input device 110 is the touch pad.

The integrated speaker 160 outputs the audio signals in the low-pitched tone band and the middle and high-pitched tone band, which are subjected to the signal processing by the signal processor 130 among the video and audio data included in the contents. To output the audio signals in the low-pitched tone band and the middle and high-pitched tone band, the integrated speaker 160 may include a woofer speaker 161 and at least one front speaker 163. The woofer speaker 161 outputs the audio signal in the low-pitched tone band which is subjected to the signal processing by the signal processor 130. The at least one front speaker 163 is adjacent to the woofer speaker 161 and may output the audio signal in the middle and high-pitched tone band which is subjected to the signal processing by the signal processor 130. According to an exemplary embodiment, the at least one front speaker 163 is adjacent to the woofer speaker 161, and may output the audio signal in the middle and high-pitched tone band which is subjected to the signal processing by the signal processor 130 in the same output direction as the audio output direction of the woofer speaker 161. Therefore, the integrated speaker 160 may output the audio signals in the low-pitched tone band and the middle and high-pitched tone band in the same output direction through the woofer speaker 161 and the at least one front speaker 163 adjacent to the woofer speaker 161.

The plurality of integrated speakers 160 are located at an end area of the display apparatus. Therefore, the audio signals in the low-pitched tone band and the middle and high-pitched tone band output from the woofer speakers 161 and the at least one front speaker 163, which are included in each of the plurality of integrated speakers 160, are fired down and the down-fired audio signals in the low-pitched tone band and the middle and high-pitched tone band may be diffracted by the lower surface adjacent to the display apparatus 100 and transferred to the front surface of the display apparatus 100.

Figure 4:
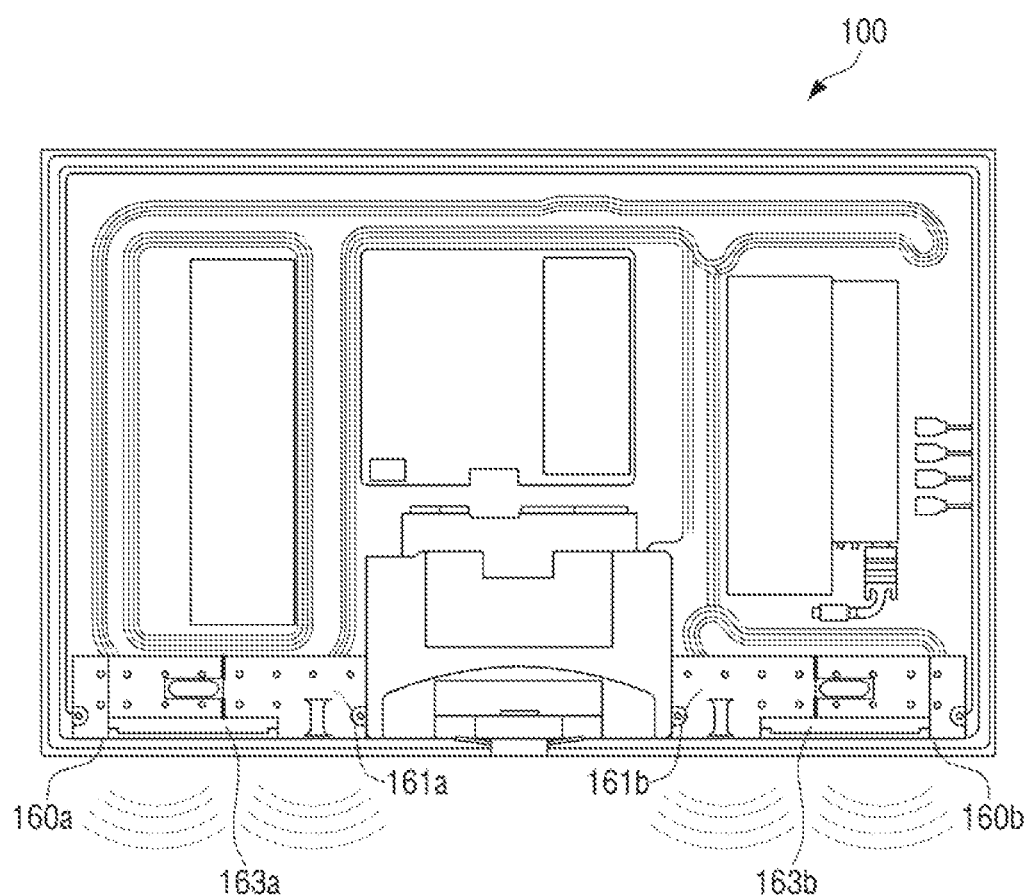
FIG. 4 is a diagram of an operation of firing audio signals in a low-pitched tone band and a middle and high-pitched tone band through a plurality of integrated speakers in the display apparatus according to an exemplary embodiment.

FIG. 4 is a diagram of the operation of radiating audio signals in the low-pitched tone band and the middle and high-pitched tone band through the plurality of integrated speakers in the display apparatus according to an exemplary embodiment.

As illustrated in FIG. 4, the end area of a display apparatus 100 may be mounted with a plurality of integrated speakers 160a and 160b. In detail, among the plurality of integrated speakers, a first integrated speaker 160a may be mounted in the left area in the end area of the display apparatus 100 and a second integrated speaker 160b may be mounted in a right area in the end area of the display apparatus 100. Therefore, the first integrated speaker 160a mounted in a lower left area of the display apparatus 100 may include a first woofer speaker 161a and a first front speaker 163a and the second integrated speaker 160b mounted in a lower right area of the display apparatus 100 may include a second woofer speaker 161b and a second front speaker 163b.

In the above configuration in FIG. 4, the first and second woofer speakers 161a and 161b are speakers which fire the same audio signal in the low-pitched tone band down and the first and second front speakers 163a and 163b are speakers which fire the audio signal in the middle and high-pitched tone band down. In this case, the audio signal in the middle and high-pitched tone band fired through the first front speaker 163a may be a left channel audio signal and the audio signal in the middle and high-pitched tone band radiated through the second front speaker 163b may be a right channel audio signal. Further, an audio output terminal which outputs the audio signal in the low-pitched tone band through the first woofer speaker 161a and an audio output terminal which outputs the audio signal in the middle and high-pitched tone band corresponding to the left channel through the first front speaker 163a maximally adhere to each other to output the respective audio signals in the same direction. Similarly, an audio output terminal which outputs the audio signal in the low-pitched tone band through the second woofer speaker 161b and an audio output terminal which outputs the audio signal in the middle and high-pitched tone band corresponding to the right channel through the second front speaker 163b maximally adhere to each other to output the respective audio signals in the same direction.

Therefore, the audio signal in the low-pitched tone band fired down through the first woofer speaker 161a and the audio signal in the middle and high-pitched tone band corresponding to the left channel fired down through the first integrated speaker 160a may be diffracted by the lower surface adjacent to the display apparatus 100 and transferred to the front surface of the display apparatus 100. Similarly, the audio signal in the low-pitched tone band fired down through the second woofer speaker 161b and the audio signal in the middle and high-pitched tone band corresponding to the right channel fired down through the second integrated speaker 160b may be diffracted by the lower surface adjacent to the display apparatus 100 and transferred to the front surface of the display apparatus 100.

The first and second front speakers 163a and 163b included in each of the first and second integrated speakers 160a and 160b according to an exemplary embodiment may be configured in plural. As such, when the first and second front speakers 163a and 163b are configured in plural, the plurality of first front speakers 163a output the audio signals in the middle and high-pitched tone band corresponding to the left channel and the plurality of second front speakers 163b output the audio signals in the middle and high-pitched tone band corresponding to the right channel. As such, when each of the first and second front speakers 163a and 163b is configured in plural, a sound volume of the audio in the middle and high-pitched tone band corresponding to each of the left and right channels may be increased more than when the first and second front speakers 163a and 163b are configured as one.

Figure 5A:
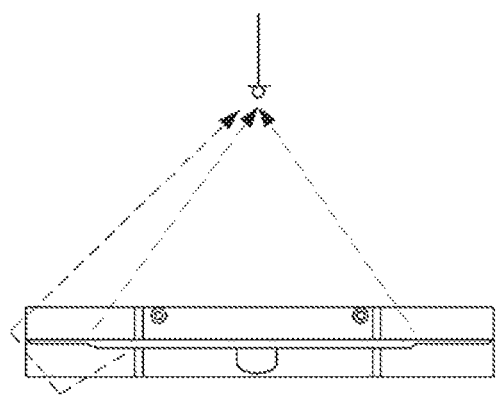
FIGS. 5A and 5B are diagrams illustrating an output direction of the audio signal output through the integrated speaker in the display apparatus according to an exemplary embodiment.
Figure 5B:
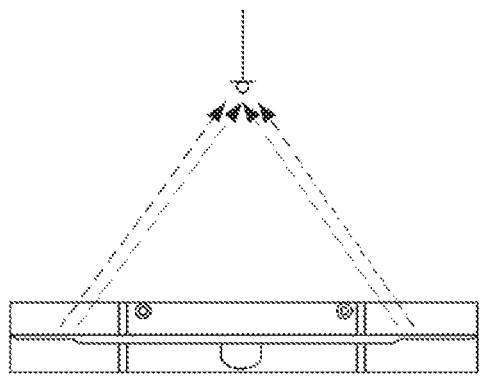

FIGS. 5A and 5B are diagrams illustrating the output direction of the audio signal output through the integrated speaker in the display apparatus according to an exemplary embodiment.

FIG. 5A illustrates an exemplary embodiment in which the audio signals output through the woofer speaker 20 and the first and second front speakers 30a and 30b are diffracted by external factors and transferred to the front surface of the display apparatus 10. Further, FIG. 5b illustrates that the audio signals in the low-pitched tone band and the middle and high-pitched tone band output through the plurality of integrated speakers 160a and 160b in the display apparatus 100 according to an exemplary embodiment are transferred to the front surface of the display apparatus 100.

As illustrated in FIG. 5A, the woofer speaker 20 outputs the audio signal in the low-pitched tone band by the back-firing scheme, in which the audio signal in the low-pitched tone band is diffracted by the back wall surface and the side wall surface adjacent to the display apparatus 10 and transferred to the front surface of the display apparatus 10. Further, the first and second front speakers 30a and 30b output the audio signals in the middle and high-pitched tone band corresponding to each of the left channel and right channel by the down-firing scheme, in which each of the audio signals in the middle and high-pitched tone band is diffracted by the lower surface adjacent to the display apparatus 10 and transferred to the front surface of the display apparatus 10.

As such, the scheme for outputting audio from the woofer speaker 20 and the scheme for outputting audio from the first and second front speakers 30a and 30b are different. Thus, the difference between the transfer distance of the audio signal in the low-pitched tone band to the front surface of the display apparatus 10 and the transfer distance of the audio signal in the middle and high-pitched tone band to the front surface of the display apparatus 10 occurs. Therefore, the phase change in the X-band section in which the audio signals in the low-pitched tone band and the middle and high-pitched tone band are commonly output occurs according to the listening position of the user. Therefore, when the user is at a position at which the phase change in the X-band section occurs, the user has an inconvenience when listening the low-quality audio in the X-band section.

As illustrated in FIG. 5b, the audio signals in the low-pitched tone band and the middle and high-pitched tone band are output through the first and second integrated speakers 160a and 160b in the display apparatus 100 according to an exemplary embodiment by the down-firing scheme. In detail, the first integrated speaker 160a outputs the audio signal in the low-pitched tone band output through the first woofer speaker 161a and the audio signal in the middle and high-pitched tone band corresponding to the left channel output through the first front speaker 163a by the down-firing scheme. Similarly, the second integrated speaker 160b outputs the audio signal in the low-pitched tone band output through the second woofer speaker 161b and the audio signal in the middle and high-pitched tone band corresponding to the right channel output through the second front speaker 163b by the down-firing scheme. Therefore, the audio signals in the low-pitched tone band and the middle and high-pitched tone band output through the first and second integrated speakers 160a and 160b are each diffracted by the lower surface adjacent to the display apparatus 100 and transferred to the front surface of the display apparatus 10.

As such, the first and second integrated speakers 160a and 160b in the display apparatus 100 according to an exemplary embodiment output the audio signals in the low-pitched tone band and the middle and high-pitched tone band by the same down-firing scheme. Therefore, the difference is small between the transfer distance of the audio signal in the low-pitched tone band to the front surface of the display apparatus 10 and the transfer distance of the audio signal in the middle and high-pitched tone band to the front surface of the display apparatus 10. Therefore, consistency of sound according to a listening position of a user may be improved.

Below, the foregoing integrated speaker 160 will be described in more detail.

Figure 6:
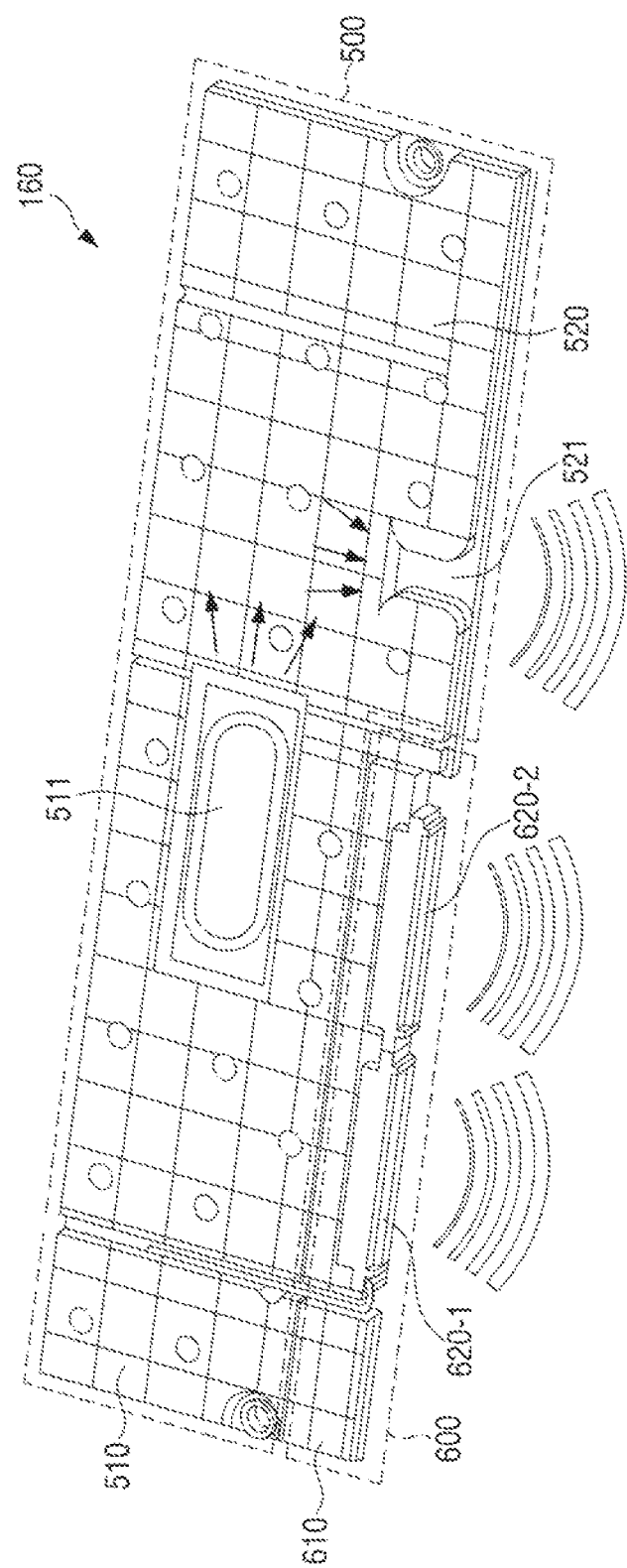
FIG. 6 is a perspective view of the integrated speaker according to an exemplary embodiment.

FIG. 6 is a perspective view of the integrated speaker according to an exemplary embodiment.

As described above, the first and second integrated speakers 160a and 160b which output the audio signal in the low-pitched tone band and the audio signal in the middle and high-pitched tone band in the same direction are mounted in the left and right end areas of the display apparatus 100. The first integrated speaker 160a mounted in the left end area of the display apparatus 100 includes the first woofer speaker 161a which outputs the audio signal in the low-pitched tone band and the first front speaker 163a which outputs the audio signal in the middle and high-pitched tone band for the left channel in the same output direction as the output direction of the audio signal of the first woofer speaker 161a. Similarly, the second integrated speaker 160b mounted in the right end area of the display apparatus 100 includes the second woofer speaker 161b which outputs the audio signal in the low-pitched tone band and the second front speaker 163b which outputs the audio signal in the middle and high-pitched tone band for the right channel in the same output direction as the output direction of the audio signal of the second woofer speaker 161b.

In detail, as illustrated in FIG. 6, each of the first and second integrated speakers 160a and 160b, which output the audio signals in the low-pitched tone band and the middle and high-pitched tone band is configured of a woofer chamber 500 and a front speaker chamber 600. The woofer chamber 500 is an area in which each of the first and second woofer speakers 161a and 161b is mounted and the front speaker chamber 600 is an area in which each of the first and second front speakers 163a and 163b is mounted.

Each woofer speaker 160 of the first and second woofer speakers 161a and 161b mounted in the woofer chamber 500 may include a woofer device 511 and a duct 521. The woofer device 511 outputs woofer sound for the audio signal in the low-pitched tone band and the duct 521 resonates an acoustic of the woofer sound output from the woofer device 511 to amplify the low-pitched tone band of the audio signal. The woofer device 511 and the duct 521 may be formed in a band pass enclosure or a vented enclosure.

According to an exemplary embodiment, each of the first and second woofer speakers 161a and 161b including the woofer device 511 and the duct 521 is formed in the band pass enclosure. In this case, the woofer chamber 500 in which each of the first and second woofer speakers 161a and 161b are mounted may be partitioned into a back chamber 510 and a front chamber 520. Therefore, the woofer device 511 which outputs the woofer sound for the audio signal in the low-pitched tone band may be formed in the back chamber 510 and the duct 521 which amplifies the low-pitched tone band of the audio signal by resonating the acoustic of the woofer sound output from the woofer device 511 may be formed in the front chamber 520.

The back chamber 510 has a structure in which the remaining area other than an area in which the woofer sound of the woofer device 511 is transferred to the front chamber 520 side is sealed and the front chamber 520 has a structure in which the remaining area other than an area in which the woofer sound of the woofer device 511 is transferred and an area in which the woofer sound having the amplified low-pitched tone band is fired through the duct 521 is sealed. Therefore, the woofer sound output through the woofer device 511 is transferred to the front chamber 520 side and the duct 521 resonates the acoustic of the woofer sound introduced into the front chamber 520. Thus, the resonated acoustic of the woofer sound may be fired to the outside. In this case, the duct 521 formed in the back chamber 510 is designed to be toward the lower surface of the display apparatus 100. Thus, the woofer sound fired through the duct 521 may be fired downwardly of the display apparatus 100.

As such, each of the first and second woofer speakers 161a and 161b according to an exemplary embodiment forms the woofer device 511 and the duct 521 in the band pass enclosure modeled by a Helmholtz resonator to serve as a band pass filter which amplifies sound corresponding to a resonance frequency in the woofer sound output from the woofer device 511 and cut-off sound having a frequency higher than that of the amplified sound. Therefore, an exemplary embodiment may amplify the low-pitched tone band while reducing a volume of the area in which the woofer device 511 outputting the woofer sound for the audio signal in the low-pitched tone band is formed. In addition, an exemplary embodiment may improve low band loss and decrease noise which ma occur during a process of synthesizing a woofer sound and duct sound by directly transferring the woofer sound for the audio signal in the low-pitched tone band to the duct 521 amplifying the low-pitched tone band.

The front speaker chamber 600 in which the first and second front speakers 163a and 163b are each mounted may be formed in a sealed enclosure in which the remaining area other than speaker devices 620-1 and 620-2 through which the audio signal in the middle and high-pitched tone band is output through each of the first and second front speakers 163a and 163b is sealed. Here, the first and second front speakers 163a and 163b may be configured in plural to expand a size in volume of the audio in the middle and high-pitched tone band corresponding to the left channel and the right channel. In this case, the plurality of first front speakers 163a and the plurality of second front speakers 163b may each output the audio signals in the same middle and high-pitched tone band corresponding to each of the left channel and the right channel through the speaker devices 620-1 and 620-2.

As such, the first and second front speakers 163a and 163b which output the audio signals in the middle and high-pitched tone band corresponding to each of the left channel and the right channel through the speaker devices 620-1 and 620-2 may be disposed to be close to the duct 521 amplifying the low-pitched tone band of the woofer sound and output the audio signal in the middle and high-pitched tone band in the same output direction as the output direction in which the woofer sound having the amplified low-pitched tone band is fired through the duct 521.

Therefore, the transfer path through which the audio signal in the low-pitched tone band output from each of the first and second woofer speakers 161a and 161b is transferred to the front surface of the display apparatus 100 is approximately the same as the transfer path through which the audio signal in the middle and high-pitched tone band output from each of the first and second front speakers 163a and 163b is transferred to the front surface of the display apparatus 100. Therefore, the distance difference between the two audio signals does not occur. Therefore, consistency of sound according to a listening position of a user may be improved.

According to an exemplary embodiment, each of the first and second woofer speakers 161a and 161b is formed in the band pass enclosure. However, an exemplary embodiment is not limited thereto, but each of the first and second woofer speakers 161a and 161b may be not only implemented in the band pass enclosure, but may be also implemented in various enclosures.

Below, the first and second woofer speakers 161a and 161b implemented in various enclosures will be described with reference to FIGS. 7 to 10.

Figure 7:
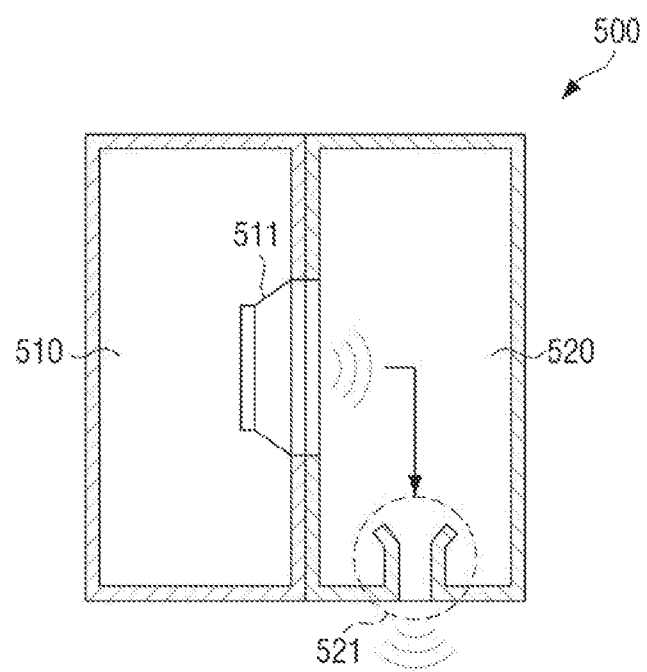
FIG. 7 is a diagram of a woofer speaker to which a band pass enclosure is applied, in the integrated speaker according to an exemplary embodiment.

FIG. 7 is a diagram of the woofer speaker to which the band pass enclosure is applied, in the integrated speaker according to an exemplary embodiment.

As illustrated in FIG. 7, the woofer chamber 500 is the band pass enclosure and is the area in which the audio signals in the low-pitched tone band are output from each of the first and second woofer speakers 161a and 161b. To this end, the woofer chamber 500 includes the back chamber 510 and the front chamber 520. The woofer device 511 which outputs the woofer sound for the audio signal in the low-pitched tone band is formed in the back chamber 510, and the duct 521 which amplifies the low-pitched tone band of the audio signal by resonating the acoustic of the woofer sound output from the woofer device 511 is formed in the front chamber 520. The back chamber 510 has a sealed structure in which the remaining area other than the area in which the woofer sound output from the woofer device 511 is transferred to the front chamber 520 side may be blocked from the outside. Further, the front chamber 520 has a sealed structure in which the remaining area other than the area in which the woofer sound output from the woofer device 511 is introduced may be blocked from the outside.

When the woofer sound output from the woofer device 511 is introduced into the front chamber 520, the duct 521 formed in the front chamber 520 serves as the band pass filter to amplify the sound corresponding to the resonance frequency in the woofer sound transferred to the front chamber 520 and blocks sound having a frequency higher than that of the amplified sound to fire the resonance sound having the amplified low-pitched tone band. As such, when the resonance sound is fired through the duct 521, the first and second woofer speakers 161a and 161b output the audio signal having the amplified low-pitched tone band to the lower area of the display apparatus 100 based on the resonance sound fired through the duct 521. Therefore, the audio signal having the amplified low-pitched tone band may be diffracted by the lower surface adjacent to the display apparatus 100 and thus transferred to the front surface of the display apparatus 100.

Figure 8:
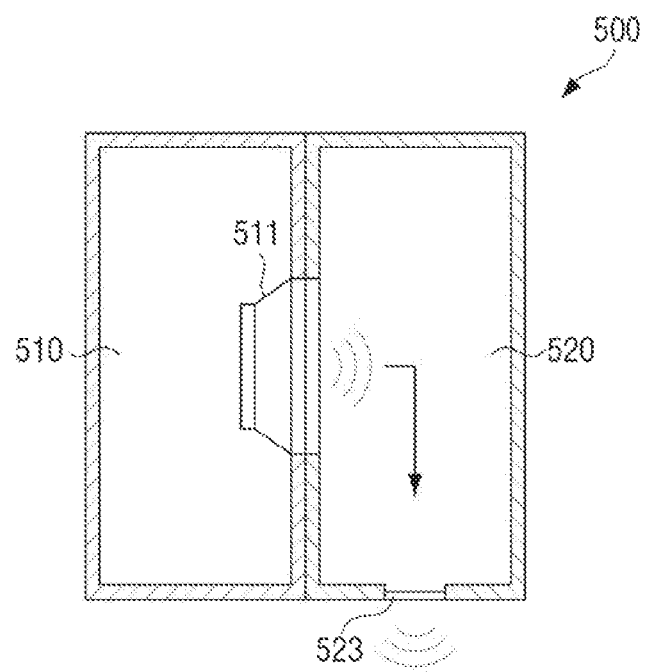
FIG. 8 is a diagram of a woofer speaker to which a passive radiator enclosure of a band pass type is applied, in the integrated speaker according to another exemplary embodiment.

FIG. 8 is a diagram of the woofer speaker to which a passive radiator enclosure of a band pass type is applied, in the integrated speaker according to another exemplary embodiment.

As illustrated in FIG. 8, the woofer chamber 500 is formed in a passive radiator enclosure of the band pass type and is the area in which the audio signals in the low-pitched tone band are output from each of the first and second woofer speakers 161a and 161b. To this end, the woofer chamber 500 includes the back chamber 510 and the front chamber 520. The woofer device 511 which outputs the woofer sound for the audio signal in the low-pitched tone band is formed in the back chamber 510 and a diaphragm 523 which amplifies the low-pitched tone band of the audio signal by resonating vibration of the woofer sound output from the woofer device 511 is formed in the front chamber 520. The back chamber 510 has the sealed structure in which the remaining area other than the area in which the woofer sound output from the woofer device 511 is transferred to the front chamber 520 side may be blocked from the outside. Further, the front chamber 520 has the sealed structure in which the remaining area other than the area in which the woofer sound output from the woofer device 511 is introduced may be blocked from the outside.

When the woofer sound output from the woofer device 511 is introduced to the front chamber 520 side, the diaphragm 523 formed in the front chamber 520 serves as the band pass filter to resonate a vibration of sound corresponding to the resonance frequency in the woofer sound transferred to the front chamber 520 and amplify the low-pitched tone band of the audio signal. As such, when the resonance sound is fired through the diaphragm 523, the first and second woofer speakers 161a and 161b output the audio signal having the amplified low-pitched tone band to the lower area of the display apparatus 100 based on the resonance sound fired through the diaphragm 523. Therefore, the audio signal having the amplified low-pitched tone band may be diffracted by the lower surface adjacent to the display apparatus 100 and transferred to the front surface of the display apparatus 100.

Figure 9:
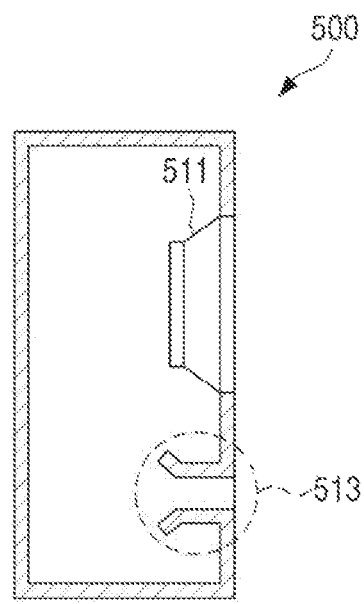
FIG. 9 is a diagram of a woofer speaker to which a vented enclosure is applied, in the integrated speaker according to an exemplary embodiment.

FIG. 9 is a diagram of the woofer speaker to which a vented enclosure is applied, in the integrated speaker according to an exemplary embodiment.

As illustrated in FIG. 9, according to an exemplary embodiment, the woofer chamber 500 is formed in the vented enclosure and is the area in which the audio signals in the low-pitched tone band are output from each of the first and second woofer speakers 161a and 161b. The woofer chamber 500 may be configured of a single chamber and the woofer device 511 and the duct 513 are formed in the woofer chamber 500. The woofer chamber 500 may have the sealed structure in which the remaining area other than the area in which the front sound and the resonance sound are fired to the outside through the woofer device 511 and the duct 513 may be blocked from the outside.

The woofer device 511 formed in the woofer chamber 500 outputs the front sound for the audio signal in the low-pitched tone band and the duct 513 resonates the acoustic of the back sound having an antiphase reproduced in back of the woofer device 511 to amplify the low-pitched tone band of the audio signal and fire the resonance sound. That is, the duct 513 amplifies the sound corresponding to the resonance frequency in the back sound reproduced in back of the woofer device 511 and blocks sound having a frequency higher than that of the amplified sound to be able to fire the resonance sound having the amplified low-pitched tone band to the outside. As such, when the back sound and the resonance sound are fired to the outside through the woofer device 511 and the duct 513, each of the first and second woofer speakers 161a and 161b synthesizes the front sound output from the woofer device 511 with the resonance sound fired through the duct 513 and fires the woofer sound, in which the front sound and the resonance sound are synthesized, by the down-firing scheme to be able to output the audio signal having the reinforced low-pitched tone band.

Figure 10:
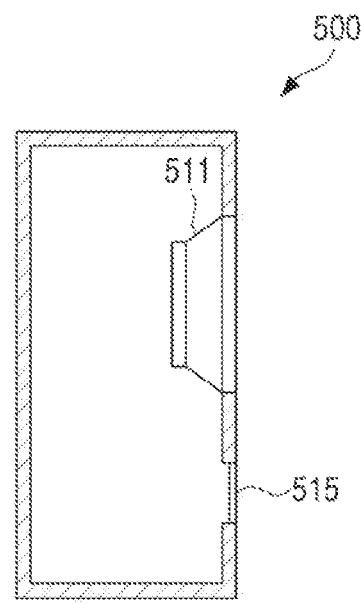
FIG. 10 is a diagram of the woofer speaker to which the passive radiator enclosure of a vented type is applied, in the integrated speaker according to another exemplary embodiment.

FIG. 10 is a diagram of the woofer speaker to which the passive radiator enclosure of the vented type is applied, in the integrated speaker according to another exemplary embodiment.

As illustrated in FIG. 10, according to an exemplary embodiment, the woofer chamber 500 is formed in the passive radiator enclosure of the vented type and is the area in which the audio signals in the low-pitched tone band are output from each of the first and second woofer speakers 161a and 161b. The woofer chamber 500 may be configured of a single chamber and the woofer device 511 and the diaphragm 515 are formed in the woofer chamber 500. The woofer chamber 500 may have the sealed structure in which the remaining area other than the area in which the front sound and the resonance sound are fired to the outside through the woofer device 511 and the diaphragm 515 may be blocked from the outside.

The woofer device 511 formed in the woofer chamber 500 outputs the front sound for the audio signal in the low-pitched tone band and the diaphragm 515 resonates the vibration of the back sound having an antiphase reproduced in back of the woofer device 511 to amplify the low-pitched tone band of the audio signal and fire the resonance sound. That is, the diaphragm 515 resonates the vibration of the sound corresponding to the resonance frequency in the back sound output in back of the woofer device 511 to be able to amplify the low-pitched tone band of the audio signal. As such, when the front sound and the resonance sound having the amplified low-pitched tone band are fired to the outside through the woofer device 511 and the diaphragm 515, each of the first and second woofer speakers 161a and 161b synthesizes the front sound output from the woofer device 511 with the resonance sound fired through the diaphragm 515 and fires the woofer sound, in which the front sound and the resonance sound are synthesized, by the down-firing scheme to be able to output the audio signal having the reinforced low-pitched tone band.

Below, the first and second front speakers 163a and 163b, which output the audio signals in the middle and high-pitched tone band from each of the first and second integrated speakers 160a and 160b, will be described in detail.

Figure 11:
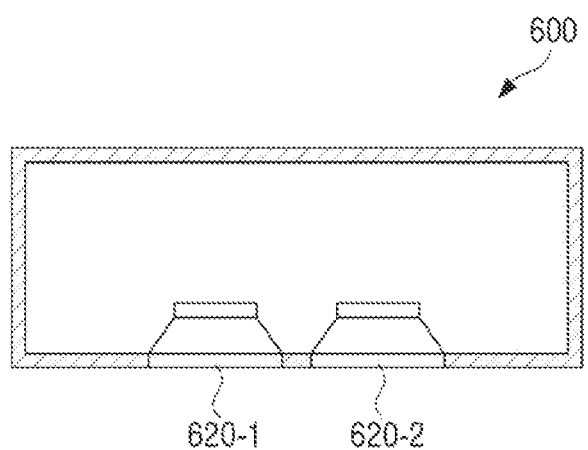
FIG. 11 is a diagram of a front speaker to which a sealed enclosure is applied, in the integrated speaker according to an exemplary embodiment.

FIG. 11 is a diagram of the front speaker to which the sealed enclosure is applied, in the integrated speaker according to an exemplary embodiment.

As illustrated in FIG. 11, the front speaker chamber 600 is an area in which each of the first and second front speakers 163a and 163b is mounted and the audio signals in the middle and high-pitched tone band corresponding to the left and right channels are output. As such, the front speaker chamber 600 in which the first and second front speakers 163a and 163b are each mounted may be configured of a single chamber and may be formed in the sealed enclosure in which the remaining area other than the area in which the audio signal in the middle and high-pitched tone band is output through the first and second front speakers 163a and 163b is sealed.

Each of the first and second front speakers 163a and 163b, which are mounted in the front speaker chamber 600, according to an exemplary embodiment, may be configured in plural to expand a size in volume of the audio in the middle and high-pitched tone band corresponding to the left channel and the right channel. In this case, the plurality of first front speakers 163a and the plurality of second front speakers 163b may each output the audio signals in the same middle and high-pitched tone band corresponding to each of the left channel and the right channel through the speaker devices 620-1 and 620-2. Therefore, the front speaker chamber 600 may output the audio signal having the expanded size of volume in the middle and high-pitched tone band through the plurality of first and second front speakers 163a and 163b.

As such, each of the first and second front speakers 163a and 163b which is mounted in the front speaker chamber 600 to output the audio signals in the middle and high-pitched tone band corresponding to the left channel and the right channel may output the audio signal in the middle and high-pitched tone band expanded from a low-pitched tone band according to an exemplary embodiment.

Figure 12:
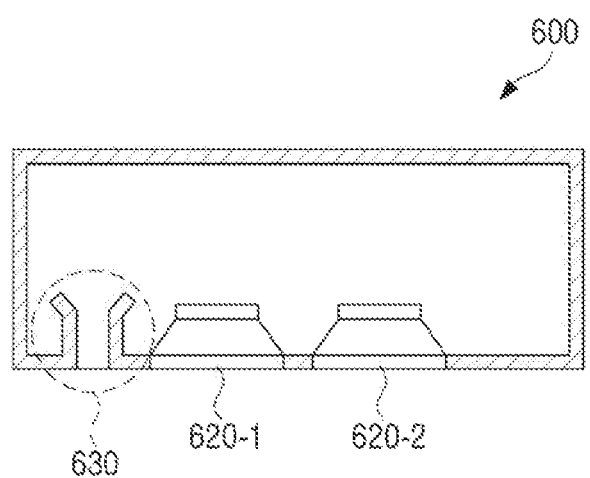
FIG. 12 is a diagram of the front speaker through which the audio signal in a middle and high-pitched tone band expanded from a low-pitched tone band is output, by applying the vented enclosure in the integrated speaker according to an exemplary embodiment.

FIG. 12 is a diagram of the front speaker through which the audio signal in a middle and high-pitched tone band expanded from a low-pitched tone band is output, by applying the vented enclosure in the integrated speaker according to an exemplary embodiment.

As illustrated in FIG. 12, according to an exemplary embodiment, each of the first and second integrated speakers 160a and 160b includes the first and second front speakers 163a and 163b which output the audio signals in the middle and high-pitched tone band corresponding to the left channel and the right channel and each of the first and second front speakers 163a and 163b is formed in the front speaker chamber 600 area. Further, the duct 630 to amplify the audio signal in the low-pitched tone band in connection with the audio signal in the middle and high-pitched tone band output from the first or second front speakers 163a and 163b is formed in the front speaker chamber 600 area. The duct 630 serves to amplify the sound corresponding to the resonance frequency in the back sound reproduced in back of the first and second front speakers 163a and 163b and blocks the sound having a frequency higher than that of the amplified sound to fire the resonance sound having the amplified band to the outside.

The front speaker chamber 600 may be formed in the vented enclosure. As the front speaker chamber 600 is formed in the vented enclosure, the front speaker chamber 600 may have a sealed structure in which the remaining area other than the area in which the audio signal in the middle and high-pitched tone band is output through the first or second front speaker 163a or 163b and the area in which the audio signal in the low-pitched tone band is output through the duct 630 is blocked from the outside.

The front speaker chamber 600 may include the first front speaker 163a which outputs the audio signal in the middle and high-pitched tone band of the left channel and the duct 630 which outputs the audio signal in the low-pitched tone band. The first front speaker 163a may be configured in plural to expand the size of volume of the audio in the middle and high-pitched tone band corresponding to the left channel. In this case, the plurality of first front speakers 163a output the audio signal in the same middle and high-pitched tone band corresponding to the left channel through the speaker devices 620-1 and 620-2 to be able to output the audio signal in the middle and high-pitched tone band having the expanded size of volume. Further, the duct 630 fires the resonance sound having the amplified sound in the band corresponding to the resonance frequency in the back sound reproduced in back of the first front speaker 163a to the outside.

The front speaker chamber 600 including the first front speaker 163a and the duct 630 may have the sealed structure in which the remaining area other than the area in which the audio signal of the left channel is output through the speaker devices 620-1 and 620-2 of the first front speaker 163a and the area in which the audio signal in the low-pitched tone band is output through the duct 630 is blocked from the outside. Therefore, the front speaker chamber 600 outputs the audio signal in the middle and high-pitched tone band of the left channel output through the speaker devices 620-1 and 620-2 of the first front speaker 163a and the resonance sound having the amplified low-pitched tone band fired through the duct 630 to the outside. The audio signal in the middle and high-pitched tone band expanded from the low-pitched tone band in connection with the audio signal of the left channel may be output to the outside through the front speaker chamber 600.

Similarly, another front speaker chamber 600 may include the second front speaker 163b which outputs the audio signal in the middle and high-pitched tone band of the right channel and the duct 630 which outputs the audio signal in the low-pitched tone band. The second front speaker 163b may be configured in plural to expand the size of volume of the audio in the middle and high-pitched tone band corresponding to the right channel. In this case, the plurality of second front speakers 163b output the audio signal in the same middle and high-pitched tone band corresponding to the right channel through the speaker devices 620-1 and 620-2 to be able to output the audio signal in the middle and high-pitched tone band having the expanded size of volume.

Further, the duct 630 fires the resonance sound having the amplified sound in the band corresponding to the resonance frequency in the back sound reproduced in back of the second front speaker 163b to the outside.

The front speaker chamber 600 including the second front speaker 163b and the duct 630 may have the sealed structure in which the remaining area other than the area in which the audio signal of the right channel is output through the speaker devices 620-1 and 620-2 of the second front speaker 163b and the area in which the audio signal in the low-pitched tone band is output through the duct 630 is blocked from the outside. Therefore, the front speaker chamber 600 outputs the audio signal in the middle and high-pitched tone band of the left channel output through the speaker devices 620-1 and 620-2 of the second front speaker 163b and the resonance sound having the amplified low-pitched tone band fired through the duct 630 to the outside. Therefore, the audio signal in the middle and high-pitched tone band having the expanded low-pitched tone band in connection with the audio signal of the left channel may be output to the outside through the front speaker chamber 600.

Figure 13:
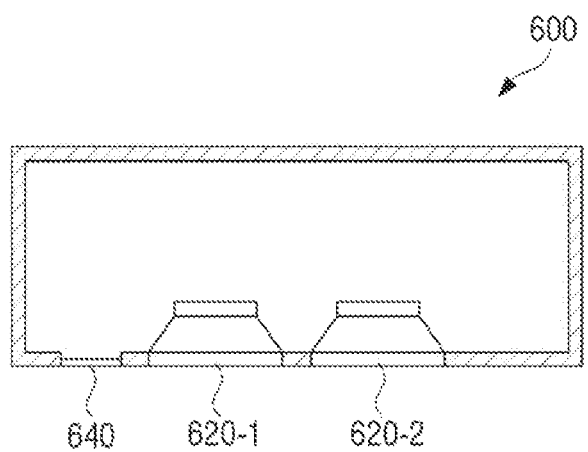
FIG. 13 is a diagram of the front speaker through which the audio signal in the middle and high-pitched tone band expanded from the low-pitched tone band is output, by applying the passive radiator enclosure of the vented type in the integrated speaker according to another exemplary embodiment.

FIG. 13 is a diagram of the front speaker through which the audio signal in the middle and high-pitched tone band extending from the low-pitched tone band is output, by applying the passive radiator enclosure of the vented type in the integrated speaker according to another exemplary embodiment.

As illustrated in FIG. 13, according to an exemplary embodiment, each of the first and second integrated speakers 160a and 160b includes the first and second front speakers 163a and 163b which output the audio signals in the middle and high-pitched tone band corresponding to the left channel and the right channel and each of the first and second front speakers 163a and 163b is formed in the front speaker chamber 600 area. Further, the diaphragm 640 to amplify the audio signal in the low-pitched tone band in connection with the audio signal in the middle and high-pitched tone band output from the first or second front speakers 163a or 163b is formed in the front speaker chamber 600 area. The diaphragm 640 serves to resonate the vibration of the back sound reproduced in back of the first and second front speakers 163a and 163b to amplify the low-pitched tone band of the audio signal and fire the resonance sound.

The front speaker chamber 600 may be formed in a passive radiator enclosure of the vented type. As the front speaker chamber 600 is formed in the passive radiator enclosure of the vented type, the front speaker chamber 600 may have the sealed structure in which the remaining area other than the area in which the audio signal in the middle and high-pitched tone band is output through the first or second front speaker 163a or 163b and the area in which the resonance sound having the amplified low-pitched tone band is fired through the diaphragm 640 is blocked from the outside.

The front speaker chamber 600 may include the first front speaker 163a which outputs the audio signal in the middle and high-pitched tone band of the left channel and the diaphragm 640 which fires the resonance sound having the amplified low-pitched tone band to the outside. As described above, the first front speaker 163a may be configured in plural to expand the size of volume of the audio in the middle and high-pitched tone band corresponding to the left channel. In this case, the plurality of first front speakers 163a output the audio signal in the same middle and high-pitched tone band corresponding to the left channel through the speaker devices 620-1 and 620-2 to be able to output the audio signal in the middle and high-pitched tone band having the expanded size of volume. Further, the diaphragm 640 fires the resonance sound having the amplified low-pitched tone band in connection with the back sound reproduced in back of the first front speaker 163a to the outside.

The front speaker chamber 600 including the first front speaker 163a and the diaphragm 640 may have the sealed structure in which the remaining area other than the area in which the audio signal of the left channel is output through the first front speaker 163a and the area in which the resonance sound having the amplified low-pitched tone band is fired to the outside through the diaphragm 640 is blocked from the outside. Therefore, the front speaker chamber 600 outputs the audio signal in the middle and high-pitched tone band of the left channel output through the first front speaker 163a and the resonance sound having the amplified low-pitched tone band fired through the diaphragm 640 to the outside. Therefore, the audio signal in the middle and high-pitched tone band having the expanded low-pitched tone band in connection with the audio signal of the left channel may be output to the outside through the front speaker chamber 600.

Similarly, another front speaker chamber 600 may include the second front speaker 163b which outputs the audio signal in the middle and high-pitched tone band of the right channel and the diaphragm 640 which fires the resonance sound having the amplified low-pitched tone band to the outside. The second front speaker 163b may be configured in plural to expand the size of volume of the audio in the middle and high-pitched tone band corresponding to the right channel. In this case, the plurality of second front speakers 163b output the audio signal in the same middle and high-pitched tone band corresponding to the right channel through the speaker devices 620-1 and 620-2 to be able to output the audio signal in the middle and high-pitched tone band having the expanded size of volume. Further, the diaphragm 640 fires the resonance sound having the amplified low-pitched tone band in connection with the back sound reproduced in back of the second front speaker 163b to the outside.

The front speaker chamber 600 including the second front speaker 163b and the diaphragm 640 may have the sealed structure in which the remaining area other than the area in which the audio signal in the middle and high-pitched tone band of the right channel is output through the second front speaker 163b and the area in which the resonance sound having the amplified low-pitched tone band is fired to the outside through the diaphragm 640 is blocked. Therefore, the front speaker chamber 600 outputs the audio signal in the middle and high-pitched tone band of the right channel output through the second front speaker 163b and the resonance sound having the amplified low-pitched tone band fired through the diaphragm 640 to the outside. Therefore, the audio signal in the middle and high-pitched tone band having the expanded low-pitched tone band in connection with the audio signal of the right channel may be output to the outside through the front speaker chamber 600.

The front speaker chamber 600 may not only output the audio signal in the middle and high-pitched tone band but may also output the audio signal expanded from the high-pitched tone band to the outside.

Figure 14:
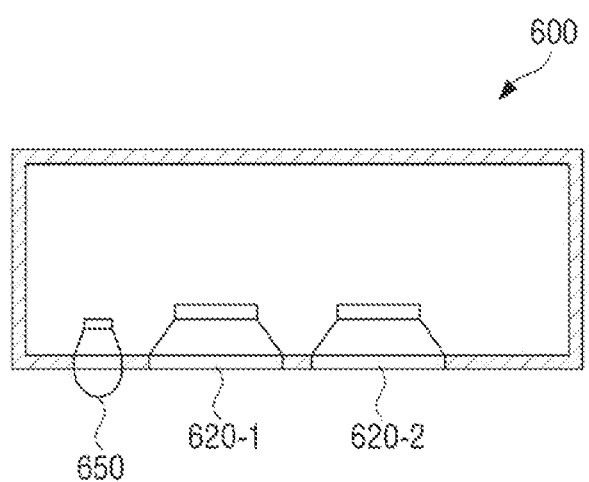
FIG. 14 is a diagram of the front speaker through which the audio signal in the middle and high-pitched tone band expanded from the high-pitched tone band is output, in the integrated speaker according to an exemplary embodiment.

FIG. 14 is a diagram of the front speaker through which the audio signal in the middle and high-pitched tone band extending from the high-pitched tone band is output, in the integrated speaker according to an exemplary embodiment.

As illustrated in FIG. 14, according to an exemplary embodiment, each of the first and second integrated speakers 160a and 160b includes the first and second front speakers 163a and 163b which output the audio signals in the middle and high-pitched tone band corresponding to the left channel and the right channel and each of the first and second front speakers 163a and 163b is formed in the front speaker chamber 600 area. Further, a tweeter 650 which outputs the audio signal in the high-pitched tone band may be included in the front speaker chamber 600 area. The tweeter 650 outputs the audio signal in the high-pitched tone band which is subjected to the signal processing by the signal processor 130.

The front speaker chamber 600 may be formed in the sealed enclosure. As the front speaker chamber 600 is formed in the sealed enclosure, the front speaker chamber 600 may have a sealed structure in which the remaining area other than the area in which the audio signal in the middle and high-pitched tone band is output through the first or second front speaker 163a or 163b and the area in which the audio signal in the high-pitched tone band is output through the tweeter 650 is blocked from the outside.

The first and second front speakers 163a and 163b outputting the audio signal in the middle and high-pitched tone band corresponding to the left channel and the right channel may be configured in plural to expand the size of volume of the audio in the middle and high-pitched tone band corresponding to the left channel and the right channel. In this case, the plurality of first and second front speakers 163a and 163b may each output the audio signals in the same middle and high-pitched tone band corresponding to the left channel and the right channel through the speaker devices 620-1 and 620-2.

The front speaker chamber 600 may include the first front speaker 163a which outputs the audio signal in the middle and high-pitched tone band of the left channel and the tweeter 650 which outputs the audio signal in the high-pitched tone band of the left channel. The front speaker chamber 600 including the first front speaker 163a and the tweeter 650 may have the sealed structure in which the remaining area other than the area in which the audio signal of the left channel is output through the first front speaker 163a and the area in which the audio signal in the high-pitched tone band of the left channel is output through the tweeter 650 is blocked from the outside. In this case, the first front speaker 163a and the tweeter 650, which are formed in the front speaker chamber 600, may output the audio signals in the middle and high-pitched tone band and the high-pitched tone band corresponding to the left channel in the same output direction. Therefore, the first front speaker 163a and the tweeter 650, which are formed in the front speaker chamber 600, may output the audio signals in the middle and high-pitched tone band and the high-pitched tone band corresponding to the left channel in the same output direction.

Similarly, another front speaker chamber 600 may include the second front speaker 163b which outputs the audio signal in the middle and high-pitched tone band of the right channel and the tweeter 650 which outputs the audio signal in the high-pitched tone band of the right channel. The front speaker chamber 600 including the second front speaker 163b and the tweeter 650 may have the sealed structure in which the remaining area other than the area in which the audio signal of the right channel is output through the second front speaker 163b and the area in which the audio signal in the high-pitched tone band of the right channel is output through the tweeter 650 is blocked from the outside. In this case, the second front speaker 163b and the tweeter 650, which are formed in the front speaker chamber 600, may output the audio signals in the middle and high-pitched tone band and the high-pitched tone band corresponding to the right channel in the same output direction. Therefore, the second front speaker 163b and the tweeter 650, which are formed in the front speaker chamber 600, may output the audio signals in the middle and high-pitched tone band and the high-pitched tone band corresponding to the right channel in the same output direction.

The front speaker chamber 600 may not only output the audio signal in the middle and high-pitched tone band but may also output the audio signal having the expanded low-pitched tone band and high-pitched tone band to the outside.

Figure 15:
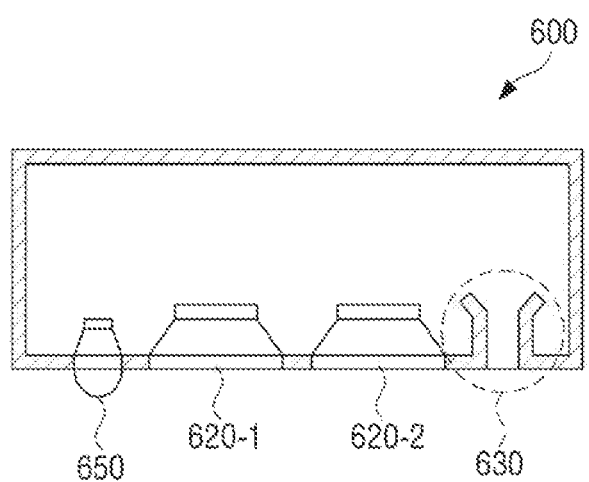
FIG. 15 is a diagram of the front speaker through which the audio signals in the low-pitched tone band to the high-pitched tone band are output, in the integrated speaker according to an exemplary embodiment.

FIG. 15 is a diagram of the front speaker through which the audio signals in the low-pitched tone band to the high-pitched tone band are output, in the integrated speaker according to an exemplary embodiment.

As illustrated in FIG. 15, according to an exemplary embodiment, each of the first and second integrated speakers 160a and 160b includes the first and second front speakers 163a and 163b which output the audio signals in the middle and high-pitched tone band corresponding to the left channel and the right channel and each of the first and second front speakers 163a and 163b is formed in the front speaker chamber 600 area. Further, the duct 630 which outputs the audio signal in the low-pitched tone band and the tweeter 650 which outputs the audio signal in the high-pitched tone band may be included in the front speaker chamber 600 area. Here, the duct 630 serves to fire the resonance sound having the amplified sound in the band corresponding to the resonance frequency in the back sound reproduced in back of the first or second front speaker 163a or 163b to the outside. Further, the tweeter 650 serves to output the audio signal in the high-pitched tone band which is subjected to the signal processing by the signal processor 130.

The front speaker chamber 600 may be formed in the vented enclosure. As the front speaker chamber 600 is formed in the vented enclosure, the front speaker chamber 600 may have a sealed structure in which the remaining area other than the area in which the audio signal in the middle and high-pitched tone band is output through the first or second front speaker 163a or 163b, the area in which the audio signal in the low-pitched tone band is output through the duct 630, and the area in which the audio signal in the high-pitched tone band is output through the tweeter 650 is blocked from the outside.

The first and second front speakers 163a and 163b outputting the audio signal in the middle and high-pitched tone band corresponding to the left channel and the right channel may be configured in plural to expand the size of volume of the audio in the middle and high-pitched tone band corresponding to the left channel and the right channel. In this case, the plurality of first and second front speakers 163a and 163b may each output the audio signals in the same middle and high-pitched tone band corresponding to the left channel and the right channel through the speaker devices 620-1 and 620-2.

In detail, the front speaker chamber 600 may include the first front speaker 163a which outputs the audio signal in the middle and high-pitched tone band of the left channel, the duct 630 which outputs the audio signal in the low-pitched tone band, and the tweeter 650 which outputs the audio signal in the high-pitched tone band of the left channel. The front speaker chamber 600 including the first front speaker 163a, the duct 630, and the tweeter 650 may have the sealed structure in which the remaining area in which the audio signal of the left channel is output through the first front speaker 163a, the area in which the audio signal in the low-pitched tone band is output through the duct 630, and the area in which the audio signal in the high-pitched tone band of the left channel is output through the tweeter 650 is blocked from the outside. In this case, the first front speaker 163a, the duct 630, and the tweeter 650, which are formed in the front speaker chamber 600, may output the audio signals in the middle and high-pitched tone band, the high-pitched tone band, and the low-pitched tone band corresponding to the left channel in the same output direction. Therefore, the first front speaker 163a, the duct 630, and the tweeter 650, which are formed in the front speaker chamber 600, may output the audio signals having the low-pitched tone band and the high-pitched tone band expanded in connection with the middle and high-pitched tone band corresponding to the left channel in the same output direction.

Similarly, another front speaker chamber 600 includes the second front speaker 163b which outputs the audio signal in the middle and high-pitched tone band of the right channel, the duct 630 which outputs the audio signal in the low-pitched tone band, and the tweeter 650 which outputs the audio signal in the high-pitched tone band of the right channel. The front speaker chamber 600 including the second front speaker 163b, the duct 630, and the tweeter 650 may have the sealed structure in which the remaining area other than the area in which the audio signal of the right channel is output through the second front speaker 163b, the area in which the audio signal in the low-pitched tone band is output through the duct 630, and the area in which the audio signal in the high-pitched tone band of the right channel is output through the tweeter 650 is blocked from the outside. In this case, the second front speaker 163b, the duct 630, and the tweeter 650, which are formed in the front speaker chamber 600, may output the audio signals in the middle and high-pitched tone band, the high-pitched tone band, and the low-pitched tone band corresponding to the right channel in the same output direction. Therefore, the second front speaker 163b, the duct 630, and the tweeter 650, which are formed in the front speaker chamber 600, may output the audio signals having the low-pitched tone band and the high-pitched tone band expanded in connection with the middle and high-pitched tone band corresponding to the right channel in the same output direction.

Figure 16:
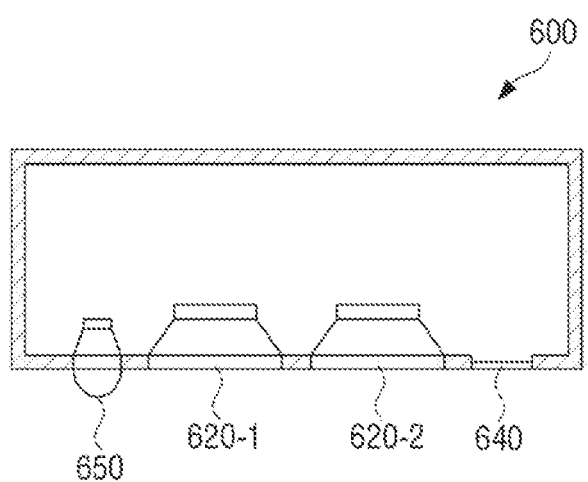
FIG. 16 is a diagram of the front speaker through which the audio signals in the low-pitched tone band to the high-pitched tone band are output, by applying the passive radiator enclosure of the vented type in the integrated speaker according to another exemplary embodiment.

FIG. 16 is a diagram of the front speaker through which the audio signals in the low-pitched tone band to the high-pitched tone band are output, by applying the passive radiator enclosure of the vented type in the integrated speaker according to another exemplary embodiment.

FIG. 16 illustrates that in relation to FIG. 15 described above, in the front speaker chamber 600, the diaphragm 640 is formed in the duct 630 through which the audio signal in the low-pitched tone band is output.

In detail, the front speaker chamber 600 includes the first front speaker 163a which outputs the audio signal in the middle and high-pitched tone band of the left channel, the duct 630 which resonates the vibration of the back sound reproduced in back of the first front speaker 163a to fire the resonance sound having the amplified low-pitched tone band of the audio signal, and the tweeter 650 which outputs the audio signal in the high-pitched tone band of the left channel. The front speaker chamber 600 including the first front speaker 163a, the diaphragm 640, and the tweeter 650 may have the sealed structure in which the remaining area other than the area in which the audio signal in the middle and high-pitched tone band of the left channel is output through the first front speaker 163a, the area in which the resonance sound for the audio signal in the low-pitched tone band is output through the diaphragm 640, and the area in which the audio signal in the high-pitched tone band of the left channel is output through the tweeter 650 is blocked from the outside. In this case, the first front speaker 163a, the diaphragm 640, and the tweeter 650, which are formed in the front speaker chamber 600, may output the resonance sound for the audio signals in the middle and high-pitched tone band, the high-pitched tone band, and the low-pitched tone band corresponding to the left channel in the same output direction. Therefore, the first front speaker 163a, the diaphragm 640, and the tweeter 650, which are formed in the front speaker chamber 600, may output the audio signals having the low-pitched tone band and the high-pitched tone band expanded in connection with the middle and high-pitched tone band corresponding to the left channel in the same output direction.

Similarly, another front speaker chamber 600 includes the second front speaker 163b which outputs the audio signal in the middle and high-pitched tone band of the right channel, the diaphragm 640 which fires the resonance sound having the amplified low-pitched tone band, and the tweeter 650 which outputs the audio signal in the high-pitched tone band of the right channel. The front speaker chamber 600 including the second front speaker 163b, the diaphragm 640, and the tweeter 650 may have the sealed structure in which the remaining area other than the area in which the audio signal of the right channel is output through the second front speaker 163b, the area in which the resonance sound for the audio signal in the low-pitched tone band is output through the diaphragm 640, and the area in which the audio signal in the high-pitched tone band of the right channel is output through the tweeter 650 is blocked from the outside. In this case, the second front speaker 163b, the diaphragm 640, and the tweeter 650, which are formed in the front speaker chamber 600, may output the resonance sound for the audio signals in the middle and high-pitched tone band, the high-pitched tone band, and the low-pitched tone band corresponding to the right channel in the same output direction. Therefore, the second front speaker 163b, the diaphragm 640, and the tweeter 650, which are formed in the front speaker chamber 600, may output the expanded audio signals having the low-pitched tone band and the high-pitched tone band in connection with the middle and high-pitched tone band corresponding to the right channel in the same output direction.

According to an exemplary embodiment, the first and second integrated speakers 160a and 160b, which each output the audio signals in the middle and low-pitched tone band corresponding to the left channel and the right channel, and the audio signal in the low-pitched tone band may be implemented in a single form. In this case, the single first and second front speakers 163a and 163b may each output the audio signals in the middle and low-pitched tone band corresponding to the left channel and the right channel through the speaker devices 620-1 and 620-2.

Figure 17:
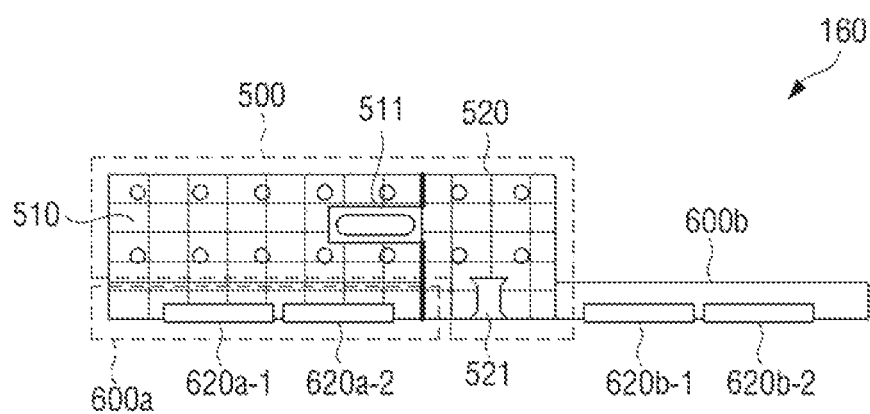
FIG. 17 is a diagram of the integrated speaker through which the audio signals in the middle and low-pitched tone band and the low-pitched tone band corresponding to a left channel and a right channel are output, in the display apparatus according to an exemplary embodiment.

FIG. 17 is a diagram of the integrated speaker through which the audio signals in the middle and low-pitched tone band and the low-pitched tone band corresponding to a left channel and a right channel are output, in the display apparatus according to an exemplary embodiment.

The integrated speaker 160, which is implemented in the single form, is mounted at a center of the end of the display apparatus 100 such that the audio signals are output in the middle and low-pitched tone band and the low-pitched tone band corresponding to the left channel and the right channel.

As illustrated in FIG. 17, the integrated speaker 160 in the single form includes the woofer chamber 500 and the first and second front speaker chambers 600a and 600b. The woofer chamber 500 is the area in which the woofer speaker 161 which outputs the audio signal in the low-pitched tone band is mounted. Further, the first and second front speaker chambers 600a and 600b are the area in which each of the first and second front speakers 163a and 163b which outputs the audio signals in the middle and high-pitched tone band of the left channel and the right channel is mounted The woofer chamber 500 and the first front speaker chamber 600a in which the woofer speaker 161 and the first front speaker 163a are each mounted may be formed similar to FIG. 6. Further, the second front speaker chamber 600b in which the second front speaker 163b is mounted may be formed adjacent to the front chamber 520 of the woofer chamber 500. Similar to FIG. 6, the woofer chamber 500 in FIG. 17 may be partitioned into the back chamber 510 in which the woofer device 511 is formed and the front chamber 520 in which the duct 521 is formed. Therefore, the second front speaker chamber 600b may be formed adjacent to the front chamber 520 in which the duct 521 which resonates the woofer sound of the woofer device 511 introduced from the back chamber 510 to generate the resonance sound is formed.

The first and second front speakers 163a and 163b, which are formed in the first and second front speaker chambers 600a and 600b of the integrated speaker 160, implemented in the single form may be configured in plural to expand the size of volume of the audio in the middle and high-pitched tone band corresponding to the left channel and the right channel. In this case, the plurality of first front speakers 163a may output the audio signals in the same middle and high-pitched tone band corresponding to the left channel through first speaker devices 620a-1 and 620a-2 and the plurality of second front speakers 163b may output the audio signals in the same middle and high-pitched tone band corresponding to the right channel through second speaker devices 620b-1 and 620b-2.

Further, the first and second front speakers 163a and 163b and the woofer speaker 161, which are formed in each chamber of the integrated speaker 160 implemented in the single form, may output the audio signals in the same output direction. That is, the audio signal in the middle and high-pitched tone band of the left channel output from the first and second speaker devices 620a-1 and 620a-2 of the first front speaker 163a, the audio signal in the middle and high-pitched tone band of the right channel output from the first and second speaker devices 620b-1 and 620b-2 of the second front speakers 163b, and the woofer sound having the amplified audio signal in the low-pitched tone band may be output to the lower area of the display apparatus 100 through the duct 521.

Therefore, the audio signals in the middle and high-pitched tone band of the left channel and the right channel output through the first and second front speakers 163a and 163b and the woofer sound output through the woofer speaker 161 may be diffracted by the lower surface adjacent to the display apparatus 100 and transferred to the front surface of the display apparatus 100.

An exemplary embodiment describes the integrated speaker 160 implemented in the single form being provided with the first integrated speaker 160a (described with reference to FIG. 6) and the second front speaker chamber 600b which is formed adjacent to the woofer chamber 500 of the first integrated speaker 160a. However, an exemplary embodiment is not limited thereto. The woofer chamber 500 and the second front speaker chamber 600b in which the woofer speaker 161 and the second front speaker 163b in the integrated speaker 160 implemented in the single form are each mounted may be formed similar to the second integrated speaker 160b in FIG. 6. In this case, the first front speaker chamber 600a in which the first front speaker 163a is mounted may be formed adjacent to the front chamber 520 of the woofer chamber 500. In addition, the integrated speaker 160 implemented in the single form may be in a form in which the respective first and second integrated speakers 160a and 160b described with reference to FIG. 6 are coupled with each other.

Further, an exemplary embodiment describes the first and second front speaker chambers 600a and 600b including the first and second front speakers 163a and 163b which output the audio signals in the middle and high-pitched tone band corresponding to the left channel and the right channel. However, an exemplary embodiment is not limited thereto. The first and second front speaker chambers 600a and 600b may further include the duct 630 and the tweeter 650. In this case, the audio signals having the expanded low-pitched tone band and high-pitched tone band in connection with the audio signals in the middle and high-pitched tone band corresponding to the left channel and the right channel may be output.

Figure 18:
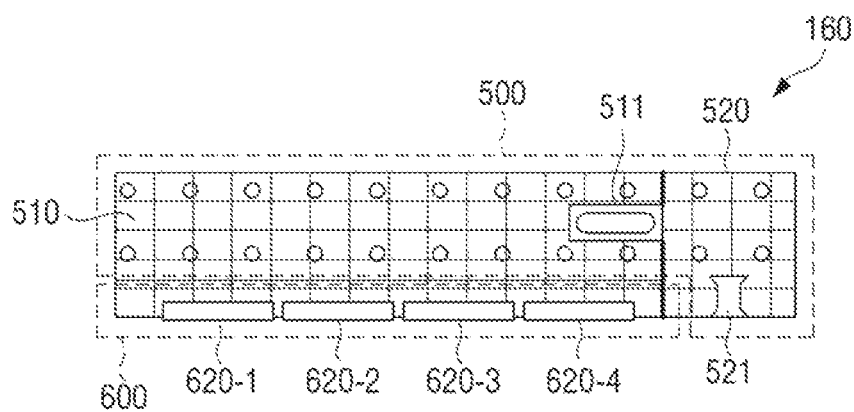
FIG. 18 is a diagram of the integrated speaker through which the audio signals in the middle and low-pitched tone band and the low-pitched tone band are output, in the display apparatus according to another exemplary embodiment.

FIG. 18 is a diagram of the integrated speaker through which the audio signals in the middle and low-pitched tone band and the low-pitched tone band are output, in the display apparatus according to another exemplary embodiment.

As illustrated in FIG. 18, according to an exemplary embodiment, the integrated speaker 160 which outputs the audio signals in the middle and low-pitched tone band and the low-pitched tone band corresponding to the left channel or the right channel includes the woofer chamber 500 and the front speaker chamber 600. As described above, the woofer chamber 500 is the area in which the woofer speaker 161 which outputs the audio signal in the low-pitched tone band is mounted and the front speaker chamber 600 is the area in which the front speaker 163 which outputs the audio signal in the middle and high-pictured tone band of the left channel or the right channel is mounted.

Similar to FIG. 6, the woofer chamber 500 in FIG. 18 may be partitioned into the back chamber 510 in which the woofer device 511 is formed and the front chamber 520 in which the duct 521 is formed. Further, the front speaker 163 which is formed in the front speaker chamber 600 of the integrated speaker 160 to output the audio signal in the middle and high-pitched tone band corresponding to the left channel or the right channel may output the audio signal in the middle and high-pitched tone band corresponding to the left channel or the right channel through N speaker devices 620-1 to 620-N. The N speaker devices 620 may be any integer number greater than one.

As illustrated in FIG. 18, the front speaker 163 which outputs the audio signal in the middle and high-pitched tone band corresponding to the left channel or the right channel may include first to fourth speaker devices 620-1 to 620-4. In this case, the front speaker 163 may output the audio in the middle and high-pitched tone band as the volume more expanded than the size of volume of the audio in the middle and high-pitched tone band output through the single speaker device 620 That is, according to an exemplary embodiment, to expand the volume of the audio in the middle and high-pitched tone band corresponding to the left channel or the right channel, the number of speaker devices 620 proportional to the expanded size of the corresponding volume may be formed in the front speaker 163.

As set forth above, according to one or more exemplary embodiments, the speaker applied to the display apparatus may be configured into one to output the multi-channel audio signals. Further, according to exemplary embodiments, the multi-channel audio signals may be output through the single speaker to be able to provide high-quality sound without the low band loss, regardless of the listening position of the user and the distance between the display apparatus and the back wall.

Although exemplary embodiments have been disclosed for illustrative purposes, those skilled in the art will appreciate that various modifications, additions and substitutions are possible. Accordingly, such modifications, additions and substitutions should be understood to fall within the scope of the present disclosure.

What is claimed is:

1. An integrated speaker comprises:
a first speaker region comprising:
a first speaker which outputs a middle-range band of an audio signal, and
a second speaker which outputs a high-range band of the audio signal; and
a second speaker region comprising a third speaker which outputs a low-range band of the audio signal, the third speaker being disposed in an upper region of the first speaker region,
wherein the first speaker region is formed in a sealed type enclosure, and
wherein the second speaker region is formed in a band-pass type enclosure.

2. The integrated speaker as claimed in claim 1, wherein the second speaker region further comprises:
a duct which is disposed on a side of the first speaker region in a region below the third speaker and amplifies the low-range band of the audio signal output from the third speaker;
a back chamber in which the third speaker is disposed; and
a front chamber which is connected to the back chamber and in which the duct is disposed.

3. The integrated speaker as claimed in claim 1, wherein the first speaker is a middle-range speaker and the second speaker is a tweeter that is disposed side by side with the first speaker.

4. The integrated speaker as claimed in claim 1, wherein the first speaker, the second speaker and the third speaker output the audio signal in a same direction.

5. The integrated speaker as claimed in claim 2, wherein the third speaker is a woofer device.

6. The integrated speaker as claimed in claim 5, wherein the duct resonates an acoustic of a woofer sound output from the woofer device.

7. The integrated speaker as claimed in claim 1, wherein the third speaker is disposed above the first speaker region in a vertical direction.

* * * * *